United States Patent
Janssen et al.

[11] Patent Number: 6,134,132
[45] Date of Patent: Oct. 17, 2000

[54] CIRCUIT ARRANGEMENT

[75] Inventors: Hendrikus J. Janssen, Huissen; Paul R. Veldman, Oss, both of Netherlands

[73] Assignee: U.S. Philips Corporation, New York, N.Y.

[21] Appl. No.: 09/338,055

[22] Filed: Jun. 22, 1999

[30] Foreign Application Priority Data

Jun. 25, 1998 [EP] European Pat. Off. ............... 98202111

[51] Int. Cl.$^7$ ..................... H02M 7/5387; H05B 37/02

[52] U.S. Cl. ........................................ 363/132; 315/209 R

[58] Field of Search ................................ 363/16, 17, 95, 363/97, 131, 132; 315/200 R, 209 R, 224, 226

[56] References Cited

U.S. PATENT DOCUMENTS

| | | | |
|---|---|---|---|
| 4,935,672 | 6/1990 | Lammers et al. | 315/200 R |
| 4,949,016 | 8/1990 | De Bijl et al. | 315/208 |
| 4,952,845 | 8/1990 | Veldman | 315/209 R |
| 5,068,573 | 11/1991 | Bruning et al. | 363/132 |
| 5,903,110 | 5/1999 | Pol et al. | 315/307 |

*Primary Examiner*—Matthew Nguyen
*Attorney, Agent, or Firm*—Bernard Franzblau

[57] ABSTRACT

In a self-oscillating bridge circuit, the control of the low switch (6) is derived from the control of the high switch (7) by coupling the control circuitry (SC2) of the low switch to a terminal P in the control circuitry of the high switch by means of a diode (D1). The control of the low switch is improved by incorporating control circuitry (SC3) for rendering the low switch conducting for a short period after the high switch has become non-conducting.

20 Claims, 4 Drawing Sheets

CIRCUIT ARRANGEMENT

BACKGROUND OF THE INVENTION

This invention relates to a circuit arrangement for supplying a lamp, comprising a DC/AC converter for generating, from an input voltage, a high-frequency lamp current at a frequency f, and provided with input terminals for connection to terminals of a power supply source supplying the input voltage, a first branch interconnecting the input terminals and comprising a series arrangement of a first switching element and a second switching element, a first control circuit coupled to a control electrode of the first switching element for rendering the first switching element conducting and non-conducting, a second control circuit coupled to a control electrode of the second switching element and also coupled to a point P of the first control circuit for rendering the second switching element conducting dependent upon the voltage present at the point P, and a load circuit shunting one of the switching elements and having terminals for connection of a lamp.

A circuit arrangement of this type is known from EP 0 294 878. In the known circuit arrangement, the first control circuit comprises a series arrangement of an inductive element L1 and a capacitive element C1, which series arrangement shunts a part of a ballast coil arranged in series with the lamp. The point P is constituted by a common point of the inductive element L1 and the capacitive element C1, and the second control circuit is connected to the point P via a diode. One end of the capacitive element C1 remote from the point P is connected to a common point A of the first and the second switching element of the first branch. Since the ballast coil conveys the lamp current during operation, alternating voltages of the frequency f are present both across the inductive element L1 and across the capacitive element C1. The AC voltage across the capacitive element C1 is used as a control signal for rendering the first switching element conducting and non-conducting. The control of the second switching element is derived from the control of the first switching element, i.e. the second switching element is rendered conducting when the voltage at the point P has reached a relatively low value. During normal operation of the circuit arrangement, this value is reached when the first switching element has been rendered non-conducting. The value of the voltage at the point P is determined by the voltage across the capacitive element C1 and the voltage at the point A. If the second control circuit is to function properly, it is necessary that the voltage at point A, after the first switching element has become non-conducting, decreases to a value which is equal to the voltage at the negative terminal of the power supply source, or is smaller than this voltage. However, practice has proved that, for example, in the case of a relatively low amplitude of the input voltage or in the case of the lamp having rectifying properties, the voltage at point A decreases to an insufficient extent, so that the second switching element is not rendered conducting and the DC/AC converter stops functioning.

SUMMARY OF THE INVENTION

It is an object of the invention to provide a circuit arrangement in which the drawback described above is obviated.

According to the invention, a circuit arrangement of the type described in the opening paragraph is therefore characterized in that the DC/AC converter is also provided with a third control circuit for rendering the second switching element conducting during a time interval $\Delta t1$, which is smaller than $\frac{1}{2}f$, after the first switching element has become non-conducting.

Since the third control circuit renders the second switching element conducting, a current can flow from the point A to the negative terminal of the power supply source, so that the voltage at point A decreases to the voltage which is present at this negative terminal. Since the voltage at point A has decreased to a sufficient extent, the second control circuit is capable of rendering the second switching element conducting in the next half cycle of the voltage at point A, so that the DC/AC converter continues to function, irrespective of, for example, the amplitude of the input voltage or the properties of the lamp fed by the circuit arrangement. The second switching element is rendered non-conducting by the second control circuit when the voltage at the point P reaches a higher value than the negative terminal of the power supply voltage. It should be prevented that both switching elements are conducting simultaneously. For this reason, it is necessary that the third control circuit does not render the second switching element conducting any longer when the second control circuit renders the second switching element non-conducting. In other words, the time interval $\Delta t1$ during which the third control circuit renders the second switching element conducting must be smaller than $\frac{1}{2}f$.

Satisfactory results were found with embodiments of a circuit arrangement according to the invention in which the second control circuit is coupled to the point P via a unidirectional element, preferably a diode. The coupling between the first and the second control circuit is thus realized in a relatively simple and effective way. More particularly, satisfactory results were obtained if the circuit arrangement comprises a comparator, with respective inputs of the comparator being coupled to the control electrode and a main electrode of the first switching element, and with an output of the comparator being coupled to the unidirectional element.

The third control circuit preferably comprises a circuit section I for detecting a decrease of the voltage at a point A between the two switching elements of the first branch. Since a decrease of the voltage at point A is caused by the fact that the first switching element becomes non-conducting, the circuit section I indirectly detects that the first switching element has been rendered non-conducting so that the third control circuit can render the second switching element conducting when a voltage decrease of the voltage at point A is detected. It was found that a third control circuit comprising such a circuit section I functions in a very reliable manner.

Satisfactory results were found with embodiments of the third control circuit comprising a monostable multivibrator. This monostable multivibrator produces a control pulse having a relatively long period whenever the first switching element has become non-conducting. By means of this control pulse, the third control circuit renders the second switching element conducting for only a limited period of time in each high-frequency period. This limited period of time may be chosen to be such that the second switching element is conducting for a sufficiently long time to cause the voltage at point A to decrease to the desired level, while it is also prevented that the third control circuit still renders the second switching element conducting when the second control circuit renders the second switching element non-conducting.

Satisfactory results were also found with embodiments of the third control circuit, in which the circuit arrangement comprises a circuit section DR coupled to the second control circuit, the third control circuit and the control electrode of the second switching element for rendering the second switching element conducting in a delayed manner via the third control circuit and for rendering the second switching element conducting in an undelayed manner via the second control circuit. It was found that due to this delayed switching of the second switching element via the third control circuit, the risk that the two switching elements are rendered conducting simultaneously, for example, due to specific properties of the lamp, decreases considerably.

The first control circuit preferably comprises an inductive element and a capacitive element.

These and other aspects of the invention will become apparent from and will be elucidated with reference to the embodiments described hereinafter.

DETAILED DESCRIPTION OF THE PREFERRED EMBODIMENTS

Figure 1:
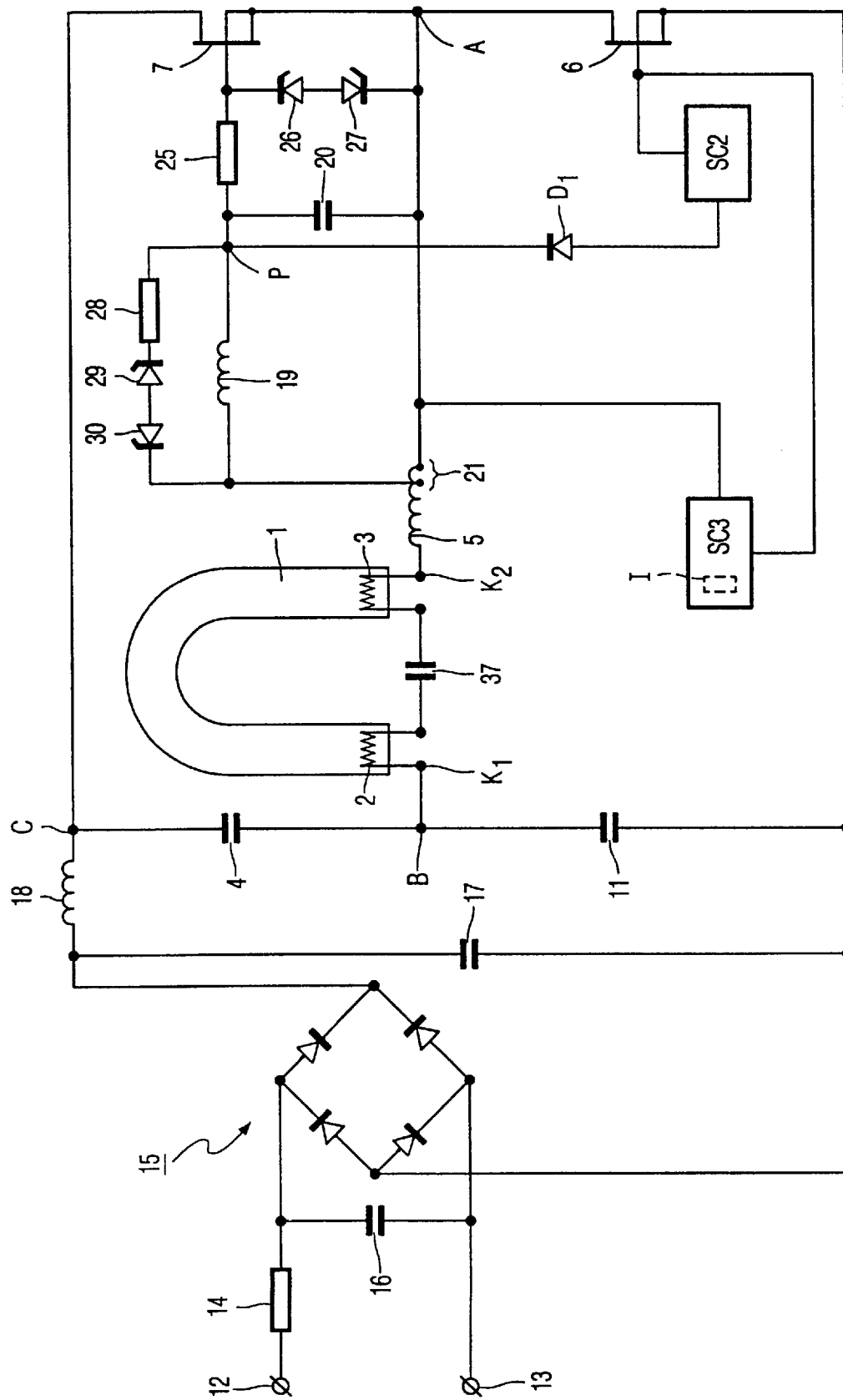
FIG. 1 shows an embodiment of a circuit arrangement according to the invention, with a discharge lamp 1 connected thereto.

In FIG. 1, the reference numerals 12 and 13 denote terminals for connection to terminals of an AC voltage source. Input terminals 12 and 13 are connected by means of a series arrangement of a fusistor 14 and a capacitor 16. Respective terminals of capacitor 16 are connected to respective inputs of a diode bridge 15. A first output of diode bridge 15 is connected to a second output by means of a capacitor 17. Capacitor 17 is shunted by a series arrangement of a coil 18, a capacitor 4 and a capacitor 11. A common point C of coil 18 and capacitor 4 constitutes a first input terminal in this embodiment. A second input terminal D is constituted by a common point of capacitor 17 and capacitor 11. Together with terminals 12 and 13, fusistor 14, capacitors 16 and 17, coil 18 and diode bridge 15, the AC voltage source constitutes a power supply source which supplies an input voltage. Coil 18 and capacitor 16 function as a filter. Input terminals C and D are interconnected by means of a first branch which is constituted by a series arrangement of a first switching element 7 and a second switching element 6. A common point B of capacitors 4 and 11 is connected to a common point A of the first and the second switching element by means of a series arrangement of terminal K1, a first electrode 2 of discharge lamp 1, capacitor 37, a second electrode 3 of lamp 1, terminal K2 and ballast coil 5. Together with capacitor 11, this series arrangement constitutes a load circuit. Terminals K1 and K2 are terminals for connection of a lamp. A part 21 of the ballast coil 5 is shunted by a series arrangement of coil 19 and capacitor 20. Coil 19 is shunted by a series arrangement of ohmic resistor 28 and zener diodes 29 and 30. P is a common point of coil 19 and capacitor 20. Capacitor 20 is shunted by a series arrangement of ohmic resistor 25 and zener diodes 26 and 27. A common point of ohmic resistor 25 and zener diode 26 is connected to a control electrode of the first switching element 7. The part 21 of ballast coil 5, coil 19, capacitor 20, ohmic resistors 25 and 28 and zener diodes 26, 27, 29 and 30 jointly constitute a first control circuit for rendering the first switching element conducting and non-conducting. The series arrangement of zener diodes 29 and 30 limits the voltage across coil 19 during operation of the circuit arrangement. Ohmic resistor 28 is used for optimizing the phase difference between the current in the load circuit and the control signal generated by the first control circuit. The series arrangement of zener diodes 26 and 27 limits the voltage between the control electrode and a main electrode of the first switching element during operation of the circuit arrangement.

Circuit section SC2 constitutes a second control circuit for rendering the second switching element conducting and non-conducting. An input of circuit section SC2 is connected to the point P via diode D1. An output of circuit section SC2 is connected to a control electrode of switching element 6. Circuit section SC3 constitutes a third control circuit for rendering the second switching element conducting during a time interval Δt1, which is shorter than ½f, after the first switching element has become non-conducting. The third control circuit SC3 comprises a circuit section I for detecting a decrease of the voltage at point A. An output of SC3 is connected to the control electrode of the second switching element. An input of SC3 is connected to the point A.

The circuit arrangement shown in FIG. 1 operates as follows.

If terminals 12 and 13 are connected to the terminals of an AC voltage source, an AC voltage supplied by the AC voltage source is rectified, and a DC voltage constituting the input voltage supplied by the power supply source is present between input terminals C and D. The first and the second control circuit render the first and the second switching element high-frequency conducting and non-conducting, respectively. As a result, a high-frequency AC current with which the lamp 1 is fed flows through the load circuit. This high-frequency current causes a high-frequency AC voltage across part 21 of ballast coil 5. As a result, high-frequency AC voltages are also present across coil 19 and capacitor 20. The high-frequency AC voltage across capacitor 20 renders the first switching element conducting if the voltage at point P is higher than the voltage at point A. If the voltage at point P is lower than that at point A, the high-frequency voltage across capacitor 20 renders the first switching element non-conducting. If the first switching element is conducting, the voltage at point A is substantially equal to that at input terminal C. The voltage at point P is higher than the voltage at point A and thus also higher than the voltage at input terminal D. In this situation, the diode D1 is non-conducting, and the non-conducting state of the second switching element is maintained by the second control circuit SC2. When subsequently the polarity of the high-frequency AC voltage across capacitor 20 changes and the voltage at point P becomes lower than the voltage at point A, the first switching element is rendered non-conducting. Due to the action of the ballast coil 5, the current through this ballast coil generally continues to flow from A to B immediately after the first switching element has become non-conducting. A diode junction which forms part of the second switching element conveys current from input terminal D to point A during this phase of operation. This action of the ballast coil and the diode junction of the second switching element is sufficient in many practical circumstances to render the voltage at point A substantially equal to that at input terminal D after the first switching element has become non-conducting. However, in some cases, for example, when the amplitude of the input voltage is relatively low or when the lamp has rectifying properties, the ballast coil and the diode junction are not capable of causing the voltage at point A to decrease to a sufficient extent. However, in the circuit arrangement shown in FIG. 1, the circuit section I which forms a part of the third control circuit detects a decrease of the voltage at point A which results from the fact that the first switching element has become non-conducting. The third control circuit SC3 subsequently renders the second switching element conducting so that the voltage at point A becomes substantially equal to the voltage at input terminal D (also if the ballast coil and the diode junction in the second switching element are not capable of realizing this). Since the voltage at point P becomes lower than that at point A in this phase of operation of the circuit arrangement, this voltage also becomes lower than the voltage at input terminal D. As a result, the diode D1 conveys current and the second control circuit SC2 renders the second switching element conducting. Upon a subsequent change of the bias of the high-frequency voltage across capacitor 20, at which the voltage at point P increases with respect to the voltage at point A, diode D1 will no longer convey current so that the second switching element is rendered non-conducting, whereafter the first switching element is rendered conducting again upon a further increase of the voltage at point P.

Figure 2:
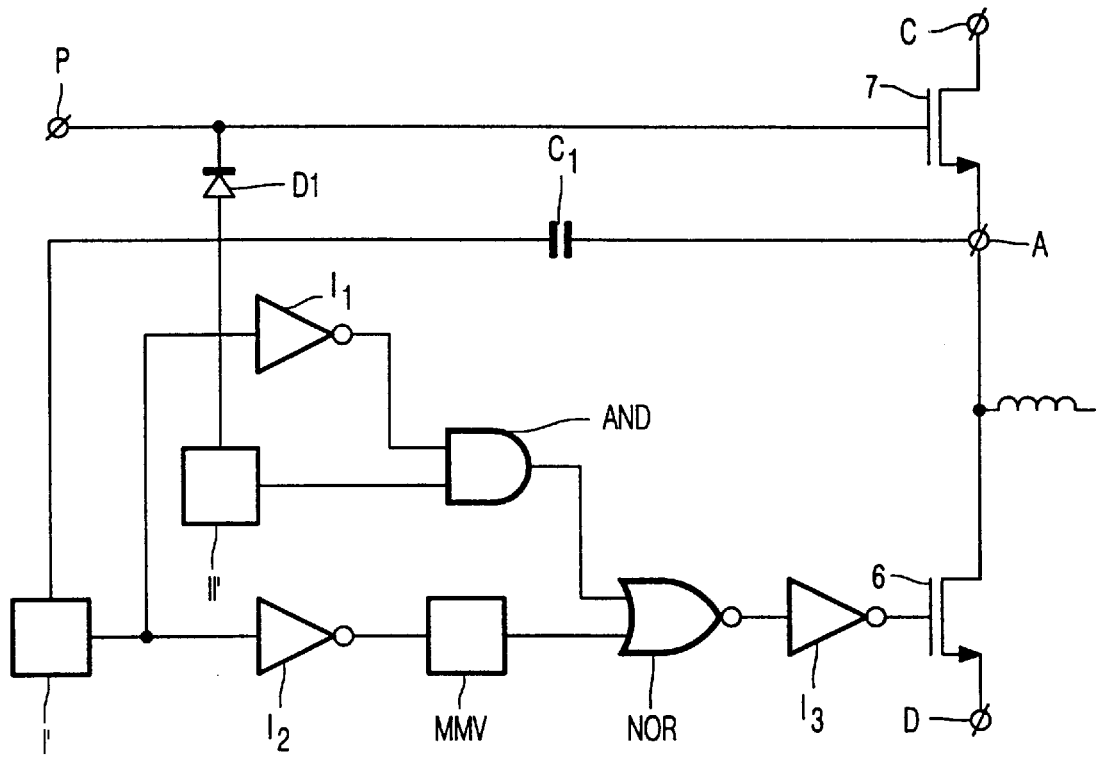
FIG. 2 shows a first embodiment of a third control circuit and a second control circuit as may be used in a circuit arrangement according to the invention, as shown in FIG. 1.

In FIG. 2, the third control circuit SC3 is constituted by circuit section I', capacitor C1, amplifier I2, monostable multivibrator MMV, NOR-gate NOR and amplifier I3. Circuit section I' and capacitor C1 jointly constitute a circuit section I for detecting a decrease of the voltage at point A. Circuit section II', amplifier I1, AND-gate AND, NOR-gate NOR and amplifier I3 jointly constitute a second control circuit SC2 which is coupled to the point P via diode D1. Amplifiers I1–I3 are inverting amplifiers.

An input of circuit section I' is connected to point A via capacitor C1. An output of circuit section I' is connected to an input of amplifier I2 and an input of amplifier I1. An output of amplifier I1 is connected to a first input of AND-gate AND. An output of amplifier I2 is connected to an input of monostable multivibrator MMV. An output of monostable multivibrator MMV is connected to a first input of NOR-gate NOR. An output of NOR-gate NOR is connected to the control electrode of the second switching element via amplifier I3. An input of the circuit section II' is connected to the point P via diode D1. An output of circuit section II' is connected to a second input of AND-gate AND. An output of AND-gate AND is connected to a second input of NOR-gate NOR.

The circuit sections shown in FIG. 2 operate as follows.

During a decrease of the voltage at point A, the output of circuit section I' is high. The output of the circuit section I' is low during the remaining period. Since I1 is an inverting amplifier, the first input of AND-gate AND is low in that case. Since the output of circuit section I' is only high during a decrease of the voltage at point A, a pulsatory signal is generated at the output of circuit section I' due to this decrease of the voltage at point A. This pulsatory signal is applied via amplifier I2 to monostable multivibrator MMV which converts this signal into a control pulse having a predetermined period of time because the output of monostable multivibrator MMV is high during the predetermined period of time. This control pulse is applied to the control electrode of the second switching element via NOR-gate NOR and amplifier I3. The third control circuit thus renders the second switching element 6 conducting during a predetermined period of time after the decrease of the voltage at point A.

When the voltage at point P is low, the output of circuit section II' is high. Only when the voltage at point P is low and the voltage at point A no longer decreases, in other words, when the first switching element has been rendered non-conducting, is the output of AND-gate AND and hence also the second input of NOR-gate NOR high. In this situation, the second control circuit renders the second switching element conducting. Amplifier I1 prevents the second control circuit from rendering the second switching element conducting in an undelayed manner, for example, due to unwanted interactions with other circuit sections, during the decrease of the voltage at point A.

Figure 3:
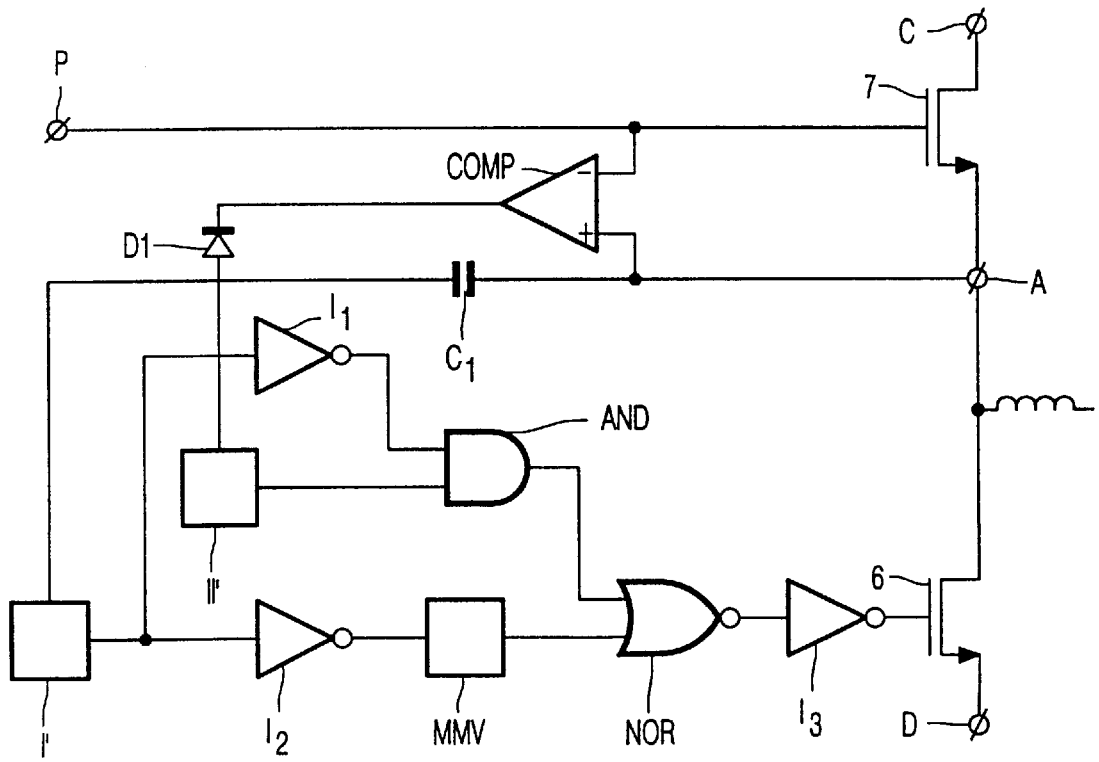
FIG. 3 shows a second embodiment of a third control circuit and a second control circuit as, may be used in a circuit arrangement according to the invention, as shown in FIG. 1.

In FIG. 3, circuit sections and components corresponding to the circuit sections and components of FIG. 2 are denoted by the same symbols. The configuration shown in FIG. 3 differs from that in FIG. 2 only in that the circuit section II also comprises a comparator COMP. The cathode of diode D1 is not connected to point P but to an output of the comparator COMP, respective inputs of which are connected to the point P and the point A. The diode D1 conveys current only when the voltage at point P is more than a threshold voltage lower than the voltage at point A. Since the voltage at point A in the configuration shown in FIG. 3 is compared with that at point P, the second control circuit has a very reliable operation. The operation of the configuration shown in FIG. 3 is further similar to that of the configuration shown in FIG. 2 and will not be described separately.

Figure 4:
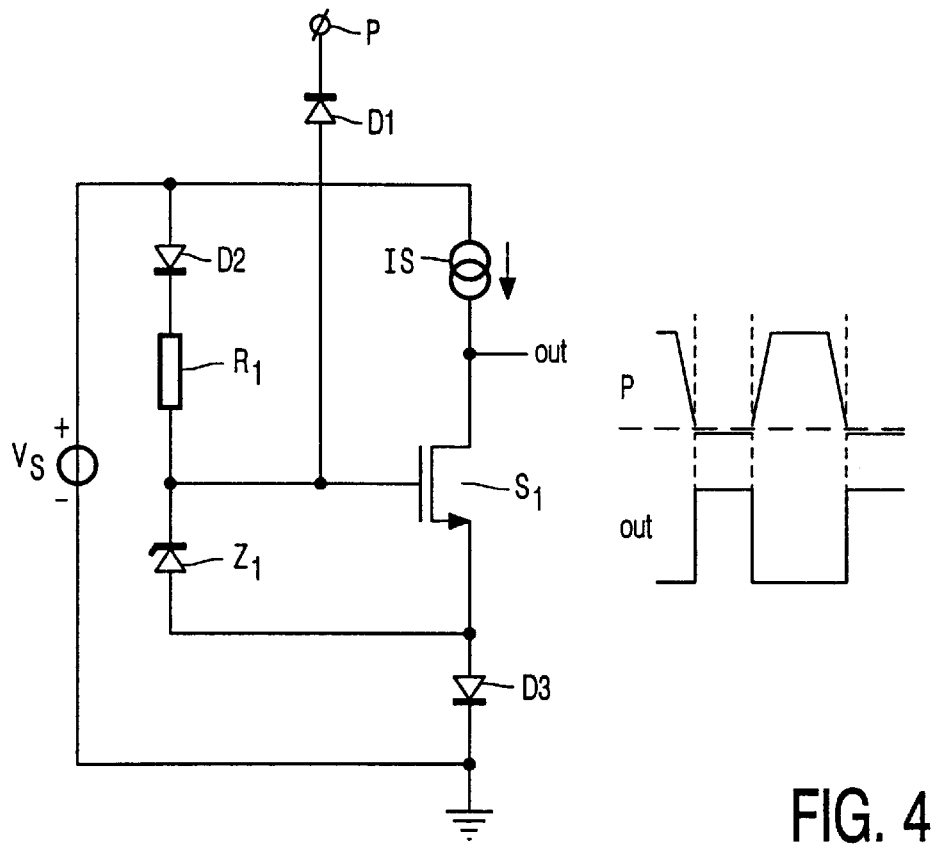
FIGS. 4 and 5 show parts of the embodiment of FIGS. 2 and 3 in greater detail.

FIG. 4 shows an embodiment of the circuit section II'. Vs is a voltage source supplying a substantially constant power supply voltage. A first terminal of Vs is connected to a second terminal thereof by means of a series arrangement of a current source IS, a transistor S1 and a diode D3. The first terminal is also connected to an anode of diode D3 by means of a series arrangement of diode D2, ohmic resistor R1 and zener diode Z1. A common point of ohmic resistor R1 and zener diode Z1 is connected to a control electrode of the transistor S1 and to an anode of diode D1. A common point of current source IS and transistor S1 functions as an output. FIG. 4 also shows the shape of the voltage at point P and the corresponding voltage at the output. If the voltage at point P is relatively high, the transistor S1 is turned on and the voltage at the output is low. If the voltage at point P decreases below a level denoted by a horizontal broken line in FIG. 4, the transistor is turned off so that the output will be high.

Figure 5:
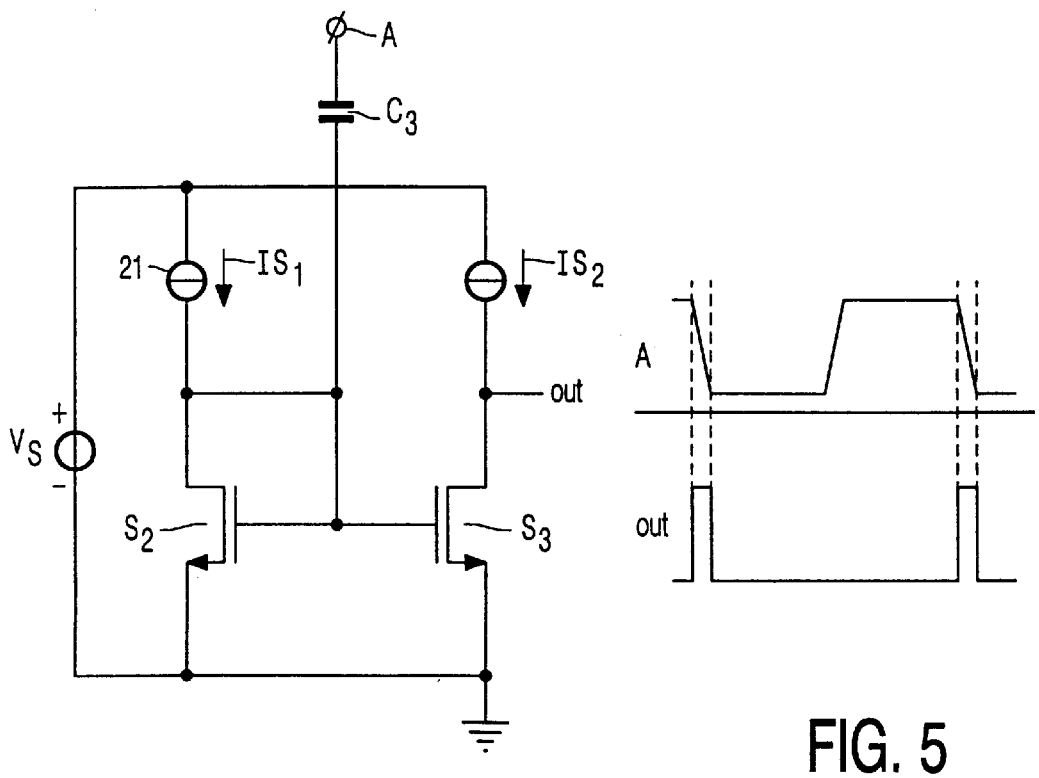

FIG. 5 shows an embodiment of the circuit section 1'. Vs is a voltage source supplying a substantially constant power supply voltage. A first terminal of Vs is connected to a second terminal thereof by means of a first series arrangement of a current source IS1 and a transistor S2 and by means of a second series arrangement of a current source IS2 and a transistor S3. Current source IS1 supplies a current which is twice as high as that supplied by the current source IS2. Respective control electrodes of transistors S2 and S3 are interconnected and are connected to a common point of current source IS1 and transistor S2. Consequently, the two transistors constitute a current mirror. Both control electrodes are also connected to point A via capacitor C3. A common point of current source IS2 and transistor S3 constitutes an output. FIG. 5 also shows the shape of the voltage at point A and the associated voltage at the output. If the capacitor C3 does not convey a current because the voltage at point A does not change, the output out of the circuit section shown in FIG. 5 is low. This is caused by the fact that transistor S3 attempts to convey as much current as transistor S2 but receives a current from current source IS2 which is only half as high. If the voltage at point A increases, the current through transistor S2 also increases via capacitor C3. Since transistor S2 constitutes a current mirror together with transistor S3, transistor S3 is also rendered more conducting so that the output out remains low. However, if the voltage at point A decreases, the current in transistor S2 will decrease through capacitor C3. Consequently, transistor S3 also becomes less conducting. If the current conveyed by transistor S3 becomes lower than the current supplied by current source IS2, the voltage at the output out becomes high. As a result, the output of the circuit section shown in FIG. 5 is high only during a decrease of the voltage at point A.

Figure 6:
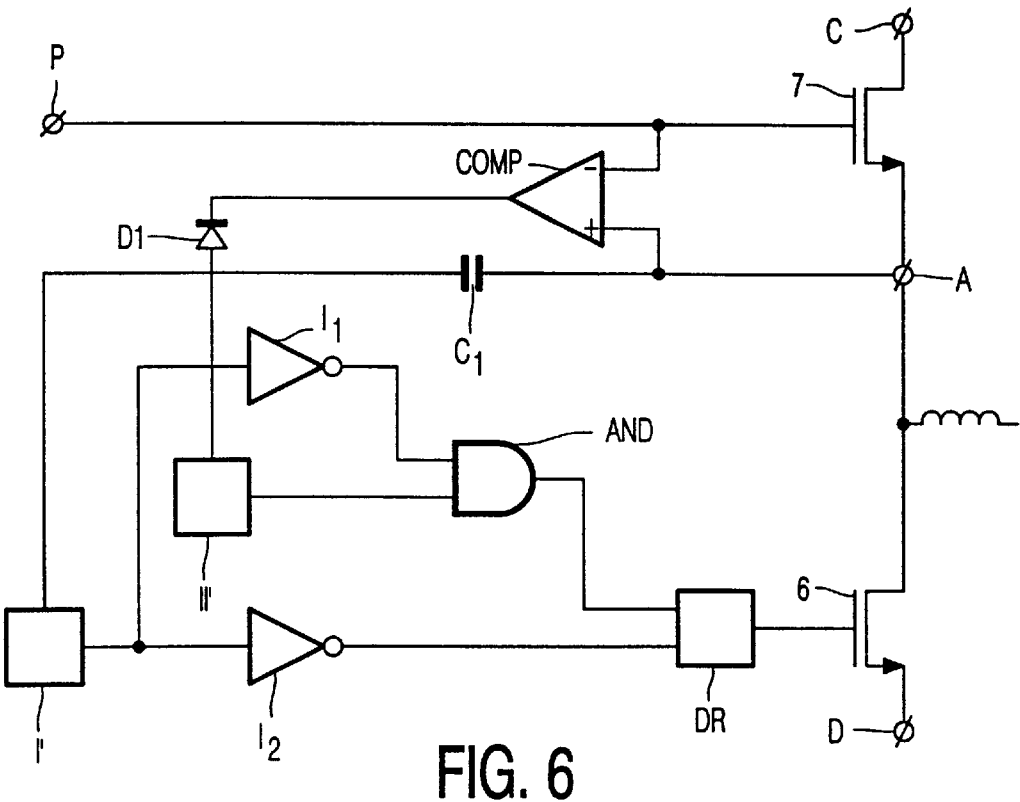
FIG. 6 shows an embodiment of a third control circuit, a second control circuit and a circuit section DR as may be used in a circuit arrangement according to the invention.

In FIG. 6, circuit sections and components corresponding to the circuit sections and components of FIG. 2 or FIG. 3 are denoted by the same symbols. The configuration shown in FIG. 6 differs from that in FIG. 3 only in that the monostable multivibrator MMV, the NOR-gate NOR and the amplifier I3 are replaced by a circuit section DR coupled to the second control circuit, the third control circuit and the control electrode of the second switching element for rendering the second switching element conducting in a delayed manner via the third control circuit and for rendering the second switching element conducting in an undelayed manner via the second control circuit. A first input of the circuit section DR is connected to the output of AND-gate AND. A second input of the circuit section DR is connected to the output of amplifier I2. An output of circuit section DR is connected to the control electrode of the second switching element. In the part of the circuit arrangement shown in FIG. 6, the second control circuit is constituted by circuit section II', amplifier I1 and AND-gate AND. The third control circuit SC3 is constituted by circuit section I', capacitor C1 and amplifier I2. If the output of the AND-gate AND is high, the circuit section DR renders the second switching element conducting in an undelayed manner. If the output of amplifier I2 is high, the circuit section DR renders the second switching element conducting in a delayed manner. Due to this delayed switching of the second switching element via the third control circuit, the risk that the two switching elements are rendered conducting simultaneously, for example, due to specific lamp behavior, is reduced considerably.

Figure 7:
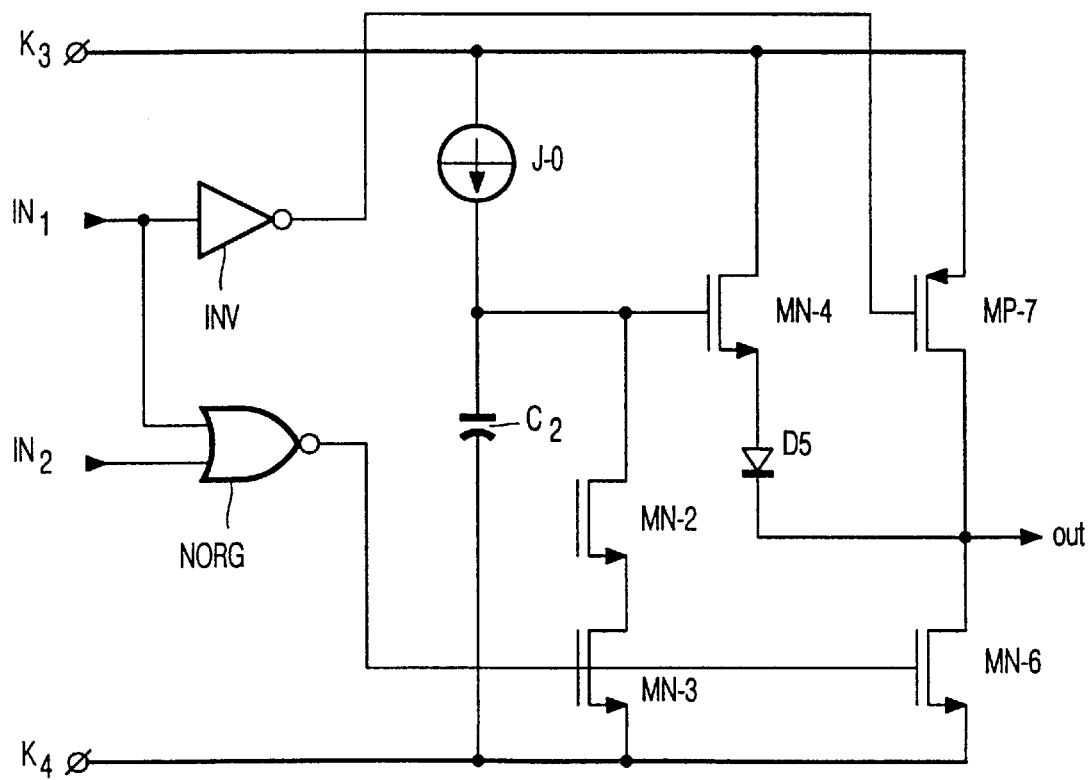
FIG. 7 shows the circuit section DR of the embodiment of FIG. 6 in greater detail.

FIG. 7 shows the structure of the circuit section DR which is present in the part of the circuit arrangement according to the invention, shown in FIG. 6. K3 and K4 are terminals between which a power supply voltage is present during operation of the circuit section DR. Terminal K3 is connected to terminal K4 by means of a series arrangement of a current source J0 and capacitor C2. Capacitor C2 is shunted by a series arrangement of transistors MN2 and MN3. A main electrode of transistor MN2 is connected to a control electrode of transistor MN2. Terminals K3 and K4 are also connected by means of a series arrangement of transistor MN4, diode D5 and transistor MN6. Transistor MN4 and diode D5 are shunted by transistor MP7. The output of circuit section DR is constituted by a common point of diode D5 and transistor MN6. A common point of current source J0 and capacitor C2 is connected to a control electrode of transistor MN4. The first input of circuit section DR is constituted by terminal IN1. Terminal IN1 is connected to an input of inverting amplifier INV and to a first input of NOR-gate NORG. An output of inverting amplifier INV is connected to a control electrode of transistor MP7. The second input of circuit section DR is constituted by terminal IN2 and is connected to a second input of NOR-gate NORG. An output of NOR-gate NORG is connected to a control electrode of transistor MN3 and a control electrode of transistor MN6.

The circuit section shown in FIG. 7 operates as follows.

If the two inputs of the circuit section DR are low, the output of NOR-gate NORG is high and the transistors MN3 and MN6 are turned on. In this situation, the control electrode of transistor MN4 is maintained at a threshold voltage by current source J0 and transistor MN2. Diode D5 prevents transistors MN2 and MN4 from forming a current mirror. If one of the two inputs of circuit section DR becomes high, the output of NOR-gate NORG will become low so that the transistors MN3 and MN6 are turned off.

If the second input is rendered high, transistor MP7 remains turned off. The voltage at the control electrode of transistor MN4 starts to increase linearly at a rate which is determined by the capacitance of capacitor C2 and the amplitude of the current supplied by J0. Transistor MN4 now operates as a source follower, and the voltage at the output of circuit section DR will increase at the same rate as the voltage at the control electrode of transistor MN4. The second switching element is rendered conducting in a delayed manner by this voltage which is present at the output of circuit section DR. If the voltage at the second input becomes low again, the output of NOR-gate NORG becomes high so that transistor MN6 is turned on and the output of circuit section DR almost immediately becomes low. Consequently, the second switching element is almost immediately rendered non-conducting.

If the first input of the circuit section DR becomes high, the transistor MP7 is almost immediately turned on so that the output of circuit section DR becomes almost immediately high and the second switching element is rendered conducting in an undelayed manner. If the first input becomes low again, transistor MP7 is almost immediately turned off so that the output of the circuit section DR becomes almost immediately low due to the fact that transistor MN6 is turned on, and the second switching element is almost immediately rendered non-conducting.

What is claimed is:

1. A circuit arrangement for supplying a lamp comprising: a DC/AC converter for generating, from an input voltage, a high-frequency lamp current at a frequency f, input terminals for connection to terminals of a power supply source supplying the input voltage, a first branch interconnecting the input terminals and comprising a series arrangement of a first switching element and a second switching element, a first control circuit coupled to a control electrode of the first switching element for rendering the first switching element conducting and non-conducting, a second control circuit coupled to a control electrode of the second switching element and also coupled to a point P of the first control circuit for rendering the second switching element conducting dependent upon the voltage present at the point P, a load circuit shunting one of the switching elements and having terminals for connection of a lamp, wherein the DC/AC converter includes a third control circuit for rendering the second switching element conducting during a time interval Δt1, which is smaller than ½f, after the first switching element has become non-conducting.

2. A circuit arrangement as claimed in claim 1, wherein the second control circuit is coupled to the point P via a unidirectional element.

3. A circuit arrangement as claimed in claim 2, wherein the unidirectional element is a diode.

4. A circuit arrangement as claimed in claim 1, wherein the third control circuit comprises a circuit section I for detecting a decrease of the voltage at a circuit point A between the two switching elements of the first branch.

5. A circuit arrangement as claimed in claim 1, wherein the third control circuit comprises a monostable multivibrator.

6. A circuit arrangement as claimed in claim 1, wherein the circuit arrangement comprises a circuit section DR coupled to the second control circuit, the third control circuit and the control electrode of the second switching element for rendering the second switching element conducting in a delayed manner via the third control circuit and for rendering the second switching element conducting in an undelayed manner via the second control circuit.

7. A circuit arrangement as claimed in claim 2, which further comprises a comparator having respective inputs coupled to the control electrode and a main electrode of the first switching element, and having an output coupled to the unidirectional element.

8. A circuit arrangement as claimed in claim 1, wherein the first control circuit comprises an inductive element and a capacitive element.

9. A self-oscillating DC/AC converter for generating a high-frequency load current at a frequency f, said DC/AC converter comprising:

first and second input terminals for connection to a source of DC supply voltage for the converter, first and second controlled switching elements connected in a first series circuit across said first and second input terminals, a first control circuit coupled to a control electrode of the first controlled switching element for alternately driving the first switching element into a conducting state and a non-conducting state, a second control circuit coupled to a control electrode of the second switching element and to a first circuit point of the first control circuit for driving the second switching element into a conducting state dependent upon a voltage present at said first circuit point, a load circuit coupled to a second circuit point between the first and second switching elements of the first series circuit, and a third control circuit coupled to the control electrode of the second switching element and responsive to a voltage change at the second circuit point, indicating that the first switching element has become non-conducting, for driving the second switching element into its conducting state for a time interval less than ½f.

10. The self-oscillating DC/AC converter as claimed in claim 9 wherein the second control circuit is coupled to the first circuit point via a unidirectional conduction element.

11. The self-oscillating DC/AC converter as claimed in claim 9 wherein, at the end of said time interval, the second control circuit maintains conduction in the second switching element until the first switching element is again conducting, at which time the second switching element is made non-conducting.

12. The self-oscillating DC/AC converter as claimed in claim 9 wherein the first control circuit includes a series resonant LC circuit including a capacitor and an inductor and with said first circuit point located between the capacitor and the inductor.

13. The self-oscillating DC/AC converter as claimed in claim 9 wherein the second control circuit is coupled to the first circuit point via a unidirectional element coupled to an output of a comparator having first and second inputs coupled to said first and second circuit points, respectively.

14. The self-oscillating DC/AC converter as claimed in claim 9 wherein the third control circuit comprises a monostable multivibrator having an input controlled by a voltage at the second circuit point and an output coupled to the control electrode of the second switching element and which determines said time interval.

15. The self-oscillating DC/AC converter as claimed in claim 9 further comprising;

a circuit section DR having first and second inputs coupled to the second control circuit and the third control circuit, respectively, and an output coupled to the control electrode of the second switching element for rendering the second switching element conducting in a delayed manner via the third control circuit and for rendering the second switching element conducting in an undelayed manner via the second control circuit, a capacitor coupling an input of the third control circuit to the second circuit point, and a unidirectional conduction element coupling an input of the second control circuit to said first circuit point.

16. The self-oscillating DC/AC converter as claimed in claim 15 wherein the input of the second control circuit is coupled to said first circuit point via a connection of the unidirectional conduction element to an output of a comparator having first and second inputs coupled to said first and second circuit points, respectively.

17. The self-oscillating DC/AC converter as claimed in claim 9 wherein the load circuit comprises a ballast inductor and first and second connection terminals for an electric discharge lamp connected in series, and said first control circuit is connected to said inductor, to said second circuit point, and to the control electrode of the first switching element.

18. The self-oscillating DC/AC converter as claimed in claim 17 further comprising;

a first capacitor connected between said first and second lamp connection terminals, second and third capacitors connected in a second series circuit across said first and second input terminals, and means coupling the load circuit between the second circuit point and a third circuit point between the second and third capacitors.

19. The self-oscillating DC/AC converter as claimed in claim 9 wherein said first control circuit comprises means for fixing the phase difference between a current in the load circuit and a control signal generated by the first control circuit for alternately driving the first switching element into a conducting state and a non-conducting state.

20. The self-oscillating DC/AC converter as claimed in claim 9 wherein said first and second switching elements comprise first and second transistors, respectively.

* * * * *